US006687193B2

(12) United States Patent
Jung

(10) Patent No.: US 6,687,193 B2
(45) Date of Patent: Feb. 3, 2004

(54) AUDIO REPRODUCTION APPARATUS HAVING AUDIO MODULATION FUNCTION, METHOD USED BY THE APPARATUS, REMIXING APPARATUS USING THE AUDIO REPRODUCTION APPARATUS, AND METHOD USED BY THE REMIXING APPARATUS

(75) Inventor: Dong-kwan Jung, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 274 days.

(21) Appl. No.: 09/838,201

(22) Filed: Apr. 20, 2001

(65) Prior Publication Data

US 2001/0038580 A1 Nov. 8, 2001

(30) Foreign Application Priority Data

Apr. 21, 2000 (KR) ........................................ 2000/021181

(51) Int. Cl.[7] .................................................. H04B 1/20

(52) U.S. Cl. ......................... 369/4; 369/30.27; 369/127; 381/119; 84/612; 84/636

(58) Field of Search ............................ 369/4, 3, 30.23, 369/30.27, 33.01, 127, 53.31; 381/119; 84/636, 612, 625

(56) References Cited

U.S. PATENT DOCUMENTS 4,300,225 A * 11/1981 Lambl ............................ 369/2
5,350,882 A * 9/1994 Koguchi et al. .............. 84/636
5,353,275 A * 10/1994 Almonte ...................... 369/189
5,512,704 A 4/1996 Adachi
6,175,623 B1 * 1/2001 Kolu et al. ................. 379/229
6,434,100 B1 * 8/2002 Usui ........................ 369/53.31
6,469,974 B1 * 10/2002 Kaneko ...................... 369/127

FOREIGN PATENT DOCUMENTS

DE 297 03 145 4/1997
DE 299 09 130 3/2000

* cited by examiner

*Primary Examiner*—Tan Dinh
(74) *Attorney, Agent, or Firm*—Burns Doane Swecker & Mathis, LLP

(57) ABSTRACT

An audio reproduction apparatus capable of modulating an audio signal with at least one of reproduction factors, including the speed and direction of reproduction, and the sound pressure of the audio signal, an audio reproduction method used by the audio reproduction apparatus, a remixing apparatus employing the audio reproduction apparatus, and a remixing method used by the remixing apparatus are provided. The audio reproduction apparatus for reproducing a first audio signal recorded in a predetermined first recording medium includes: a reproduction control unit for generating a reproduction control signal by analyzing at least one of first and second displacement values, which are varied by a user, and outputting the generated reproduction control signal; and an audio reproduction unit for modulating and reproducing the first audio signal according to the reproduction control signal. The audio reproduction apparatus can modulate an audio signal in a variety of ways. The structures of the audio reproduction apparatus and the remixing apparatus are simple, and an audio signal can be finely modulated at low cost. Drawbacks which would occur by use of a needle can be eliminated. A digital audio signal of a CD can be efficiently modulated and reproduced without need for remastering into an LP record. A high-resolution digital audio signal can be modulated and reproduced at an accurate sampling rate.

24 Claims, 7 Drawing Sheets

AUDIO REPRODUCTION APPARATUS HAVING AUDIO MODULATION FUNCTION, METHOD USED BY THE APPARATUS, REMIXING APPARATUS USING THE AUDIO REPRODUCTION APPARATUS, AND METHOD USED BY THE REMIXING APPARATUS

This application claims priority under 35 U.S.C. §§119 and/or 365 to 00-21181 filed in Republic of Korea on Apr. 21, 2000; the entire content of which is hereby incorporated by reference.

BACKGROUND OF THE INVENTION

1. Field of the Invention

The present invention relates to audio signal reproduction, and more particularly, to an audio reproduction apparatus having an audio modulation function, a method used by the audio reproduction apparatus, a remixing apparatus using the audio reproduction apparatus, and a method used by the remixing apparatus.

2. Description of the Related Art

A variety of audio signal processing techniques, such as modulation and mixing, become popular in the modern entertainment industry, even creating new musical genres, such as techno or hip hop, which employ a remixing technique regarded as a novel musical performance technique for electronic sound effects.

Remixing technique refers to a technique for mixing a plurality of songs after modification (or modulation) of a particular song selected amount the plurality of songs. The speed and/or direction of reproduction is modified for the particular song, and the reproduction signal from the selected song is mixed with the reproduction signals of the other songs which are reproduced without modification. Assuming that two songs are reproduced from long-playing (LP) records seated on separate turntables, a disc jockey can modulate and reproduce an audio signal from one of the LP records by modifying the speed and direction of rotation of the corresponding turntable to provide electronic sound effects. At this time, the non-modulated audio signal, which is reproduced from the other LP record forward at a normal speed, is mixed with the modulated audio signal to produced a remixed song. Here, the term "forward" corresponds to the original direction of reproduction. The technique for modulating the speed and direction of rotation of a turntable is referred to as "scratching".

A conventional remixing apparatus, which uses the remixing technique described above, uses turntables for LP records, and thus there are the following problems. First, since the needle to read an audio signal keeps in contact with an LP record through the period of intentionally varying the speed of the turntable on which the LP is mounted to rotate at a constant speed, lifetime of the needle becomes short with degraded sound quality. Also, information recorded on the LP may be lost. If the speed of rotation of the turntable is too high, the needle may jump out of the groove of the LP record mounted on the turntable.

Second, the conventional remixing apparatus cannot be applied to recording media other than LP records, such as compact discs (CDs), tapes or memories, which are rapidly emerging as new recording media alternative to LP records. If a user desires to remix a song recorded in a CD with another song recorded on an LP record using the conventional remixing apparatus, there is inconvenience in that remastering of the CD on which songs are recorded into an LP record is necessary before the remixing.

To address these limitations, Andre Rickli (Switzerland) discloses a conventional audio signal processor in WO 09701168 entitled "Digital Processing Device for Audio Signal". This audio signal processor detects the speed and direction of rotation of a circular plate, which is driven at a constant speed by a motor, and read the detected speed and direction using a sensor. Reproduction of an audio signal is controlled according to the information on the detected speed and direction of rotation of the circular plate. The conventional audio signal processor uses an analog LP turntable or a circular plate similar to the LP turntable in order to detect the speed and direction, so that a mechanical driving element for driving the circular plate is needed. Use of the driving element hinders miniaturization of the audio signal processor, and increases the manufacturing cost. In addition, when a digital audio signal has a high resolution, it is not possible for a user to remix an audio signal according to the sampling rate of the digital audio signal.

Due to use of such a rotatable circular plate, the conventional audio signal processor and remixing apparatus have the following problems. First, due to the inertia of the rotating circular plate, the speed of rotation cannot be finely adjusted. Second, because only the speed and direction of rotation can be modified using information obtained from the one-dimensional trajectory, i.e., a linear distance from a point of the needle on a track of the rotating plate to the center of the rotating plate, an audio signal cannot be modulated in a variety of ways.

SUMMARY OF THE INVENTION

To address the above limitations, it is a first object of the present invention to provide an audio reproduction apparatus capable of modulating an audio signal with at least one of reproduction factors including the speed and direction of reproduction of the audio signal, and the reproduction sound pressure of the audio signal.

It is a second object of the present invention to provide an audio reproduction method for the audio reproduction apparatus having the audio modulation function.

It is a third object of the present invention to provide a remixing apparatus capable of remixing a plurality of audio signals in combination with the audio reproduction apparatus having the audio modulation function.

It is a fourth object of the present invention to provide a remixing method for the remixing apparatus.

To achieve the first object of the present invention, in one embodiment there is provided an audio reproduction apparatus having audio modulation function, for reproducing a first audio signal recorded in a predetermined first recording medium, the audio reproduction apparatus comprising: a reproduction control unit for generating a reproduction control signal by analyzing at least one of first and second displacement values, which are varied by a user, and outputting the generated reproduction control signal; and an audio reproduction unit for modulating and reproducing the first audio signal according to the reproduction control signal.

To achieve the second object of the present invention, in one embodiment there is provided an audio reproduction method for the audio reproduction apparatus, the method comprising: determining whether a user intends to modulate the first audio signal; just reproducing the first audio signal if it is determined that the user does not intend to modulate the first audio signal; and modulating and reproducing the first audio signal according to the reproduction control signal if it is determined that the user intends to modulate the first audio signal.

To achieve the third object of the present invention, in one embodiment there is provided a remixing apparatus comprising: the audio reproduction apparatus for optionally modulating the first audio signal; an audio reproducer for reproducing a second audio signal recorded in a second recording medium; and a signal synthesizer for mixing the first audio signal output from the audio reproduction apparatus, and the second audio signal output from the audio reproducer, for outputting the mixed result as a remixed audio signal.

To achieve the third object of the present invention, in one embodiment there is provided a remixing method for the remixing apparatus, the remixing method comprising: reproducing the first and second audio signals; and mixing the reproduced first and second audio signals and outputting the remixed audio signal.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
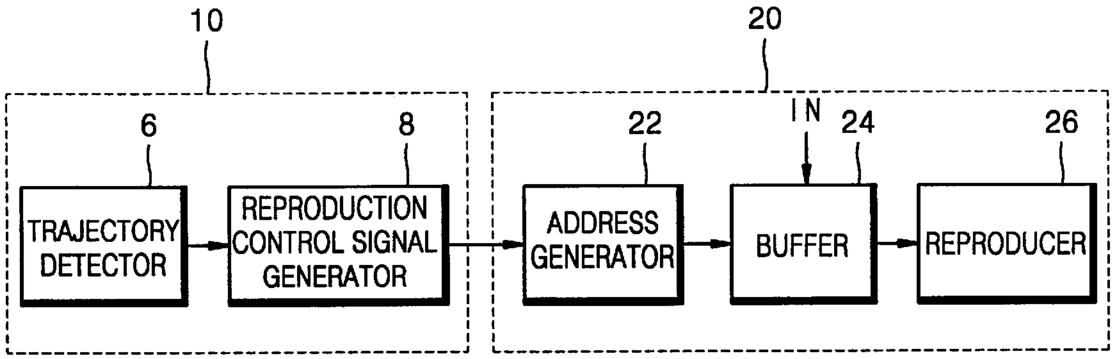
FIG. 1 is a block diagram of a preferred embodiment of an audio reproduction apparatus having an audio modulation function according to the present invention.

A preferred embodiment of an audio reproduction apparatus having an audio modulation function according to the present invention is shown in FIG. 1. The audio reproduction apparatus includes a reproduction control unit 10 and an audio reproduction unit 20. The reproduction control unit 10 generates a reproduction control signal by analyzing first and/or second displacement values, which can be varied by a user or player, and outputs the reproduction control signal to the audio reproduction unit 20. The first displacement value is varied by a user to modify the speed or direction of reproduction of an audio signal, and the second displacement value is varied to modify the sound pressure of a reproduction audio signal.

The reproduction control unit 10 includes a trajectory detector 6 and a reproduction control signal generator 8. The trajectory detector 6 is operated by a user, and outputs a trajectory coordinate signal having the first and/or second displacement values, which are detected from the user's operation, to the reproduction control signal generator 8. The trajectory detector 6 may be implemented by a touch pad, a first mouse, a combination of a second mouse and a rotatable circular plate, or a jog shuttle dial.

Figure 2A:
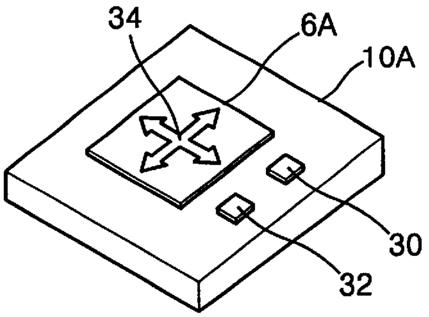
FIGS. 2A through 2C illustrate embodiments of the reproduction control unit of FIG. 1 according to the present invention.
Figure 2B:
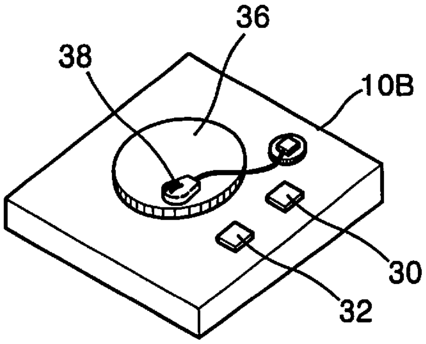
Figure 2C:
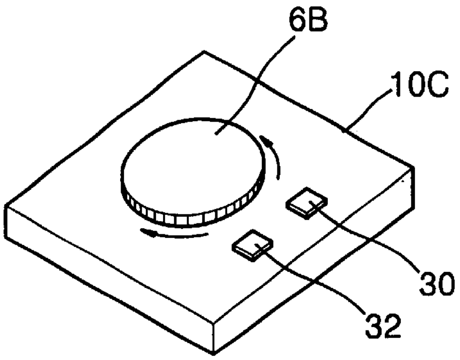

Preferred embodiments of the reproduction control unit 10 of FIG. 1 according to the present invention are shown in FIGS. 2A through 2C. A reproduction control unit 10A of FIG. 2A includes a touch pad 6A with a cross-arrow mark 34, and control keys 30 and 32. A reproduction control unit 10B of FIG. 2B includes a rotatable circular plate 36, a second mouse 38, and control keys 30 and 32. A reproduction control unit 10C of FIG. 2C includes a jog shuttle dial 6B, and control keys 30 and 32.

In the case where the trajectory detector 6 is implemented by the touch pad 6A shown in FIG. 2A, as a user touches the cross-arrow mark 34 on the touch pad 6A in a 2-dimensional manner, i.e., in the up, down, right and left directions, the touch pad 6A detects the trajectory touched along the cross-arrow mark 34, and outputs a trajectory coordinate signal having first and second displacement values, which are calculated from the coordinates of the starting and end points of the detected trajectory, to the reproduction control signal generator 8. To end this, the structure of the touch pad 6A can be diversified. For example, the touch pad 6A may include a series of parallel first electrode lines (not shown) spaced apart a predetermined distance from one another in a direction; a series of parallel second electrode lines (not shown) spaced apart a predetermined distance from one another in a direction perpendicular to the first electrode lines, which are separated from the first electrode lines by a predetermined distance, an insulator or a high-resistance filler interposed between the first and second electrode lines; and a coordinate detector (not shown) for detecting the coordinates of touched points by electrical short. The coordinate detector (not shown) of the touch pad 6A having the structure described above detects electrical short caused by touching by sequentially scanning the first and second electrode lines, and detecting the coordinates on which the electrical short occurs.

Although not illustrated, in the case where the trajectory detector 6 is implemented by a first mouse, the first mouse detects the trajectory of the mouse moved in the up, down, left and right directions by a user, and outputs a trajectory coordinate signal having first and second displacement values, which are calculated from the coordinates of the starting and end points of the detected trajectory, to the reproduction control signal generator 8. In the present embodiment, the trajectory coordinate signal is obtained by moving the first mouse, instead of touching the touch pad 6A.

According to a conventional audio reproduction apparatus, the function of the trajectory detector 6 is implemented with a turntable and a needle to read an audio signal. In this case, just the first displacement value (corresponding to the information obtained from the one-dimensional trajectory, which is used in a conventional audio processor as described previously), not the second displacement value, is detected. However, as described in the two previous embodiments, the trajectory detector 6 can detect the second displacement value as well as the first displacement value, using the touch pad 6A or the first mouse, instead of using a rotatable circular plate. As a result, an audio signal can be modulated in a variety of ways. This will be described later.

The trajectory detector 6 may be implemented by a rotatable circular plate 36 and a second mouse 38, as described in FIG. 2B. In this case, the circular plate 36 is a general turntable and is rotated by a user. The second mouse 38, which acts as a needle used in a conventional audio reproduction apparatus, is made in contact with the circular plate 36, like the needle placed on a turntable, senses the speed and direction of rotation of the contacted circular plate 36, and outputs a trajectory coordinate signal having the first displacement value, which is obtained from the sensed result, to the reproduction control signal generator 8. The structure and operation of the reproduction control unit 10B of FIG. 2B are substantially the same as those of a conventional audio signal processor which modulates songs using a turntable and a needle, except that the second mouse 38 is used instead of the needle. In the present embodiment, the trajectory detector 6 can detect only a first displacement value with the rotatable circular plate 36, as for a conventional audio signal processor. However, use of the second mouse 38 in the present embodiment according to the present invention, instead of the needle used in the conventional audio signal processor, eliminates the problems caused by use of the needle.

The first and second mouses used in the embodiments described previously are a general peripheral device of personal computers (PCs), and thus descriptions of the structure and operation thereof are not provided here.

Alternatively, the trajectory detector 6 may be implemented by a jog shuttle dial 6B, as shown in FIG. 2C. The circular jog shuttle dial 6B is rotated clockwise and counterclockwise by a user, senses the rotated result, and outputs a trajectory coordinate signal having a first displacement value, which is obtained from the sensed result, to the reproduction control signal generator 8. The jog shuttle dial 6B of FIG. 2C is a general jog shuttle dial which can reproduce an image signal at an intended speed, and thus descriptions of the structure and operation thereof are not provided here. In the present embodiment, the jog shuttle dial 6B used as the trajectory detector 6 can detect only a first displacement value, and thus it is not possible to modulate an audio signal in a variety of manners with the jog shuttle dial 6B. However, use of the jog shuttle dial 6B in the present embodiment according to the present invention, instead of the rotatable circular plate having the inertial mass, allows a user to finely adjust the speed of rotation.

Figure 3:
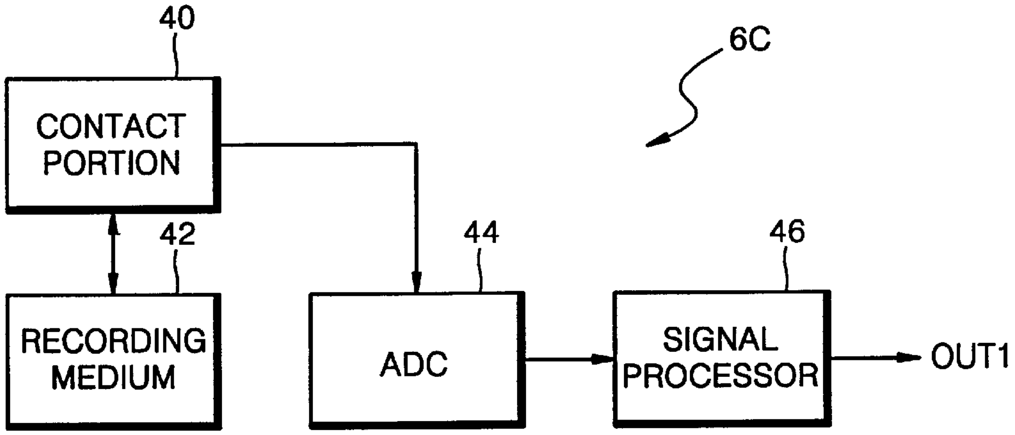
FIG. 3 is a block diagram of an embodiment of the trajectory detector of FIG. 1.

A preferred embodiment of the trajectory detector 6 of the audio reproduction apparatus according to the present invention shown in FIG. 1 is illustrated in FIG. 3. The structure and operation of the trajectory detector 6 will be described. As shown in FIG. 3, the trajectory detector 6C includes a contact portion 40, a recording medium 42, an analog-to-digital converter (ADC) 44, and a signal processor 46.

The recording medium 42 of the trajectory detector 6C of FIG. 3 is rotated by a user, and the speed and direction of rotation of the recording medium 42 are modified by a user. The recording medium 42 includes a land-groove pattern having a predetermined number of lands and grooves formed in a spiral sound groove. The contact portion 40 is brought into the sound groove of the recording medium 42, and generates an analog signal having a direction information which indicates the direction in which the recording medium 42 is rotated, i.e., clockwise or counterclockwise, and outputs the analog signal to the ADC 44 as the recording medium 42 rotates. For easy understanding of the contact portion 40 and the recording medium 42, an example of the contact portion 40 and the recording medium 42 will be described.

Figure 4:
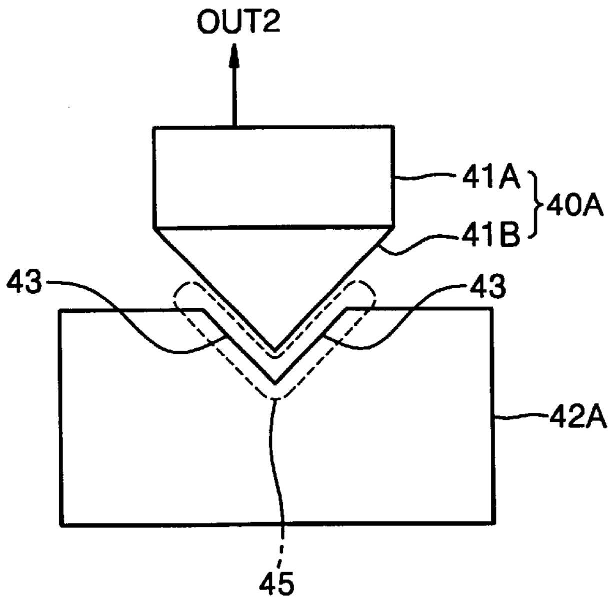
FIG. 4 illustrates an example of the contact portion and the recording medium of FIG. 3.

FIG. 4 illustrates an example of the contact portion 40 and the recording medium 42 of FIG. 3. A cartridge 41A, a needle 41B to read an audio signal (hereinafter, referred to as reading needle) and an LP record 42A are shown. As shown in FIG. 4, the contact portion 40A may be implemented with the cartridge 41A and the reading needle 41B, and the recording medium 42 may be implemented with the LP record 42A. The LP record 42A seated on a turntable is rotated, and the direction and speed of the rotation are modified by a user. The LP record 42A has a land-groove pattern having a predetermined number of lands and grooves, which are arranged along the moving path of the reading needle 41B in the surface 43 of a spiral sound groove 45. As the reading needle 41B contacts the lands and grooves formed in the surface 43 of the sound groove 45 of the LP record 42A, which is rotating, the cartridge 41A generates an analog signal which indicates the direction the recording medium is rotated, during the rotation of the LP record 42A, and outputs the generated analog signal to the ADC 44 through an output port OUT2. For example, as the reading needle 41B attached to the cartridge 41A is brought into contact with the sound groove 45 formed in the LP record 42A in a spiral direction along the circumference, the cartridge 41A generates an analog signal whose voltage level varies depending on whether the reading needle 41B contacts lands or grooves in the sound groove 45 and outputs the analog signal to the ADC 44. An embodiment of the land-groove pattern formed in the sound groove of the LP record according to the present invention will be described in greater detail with reference to FIG. 5.

Figure 5:
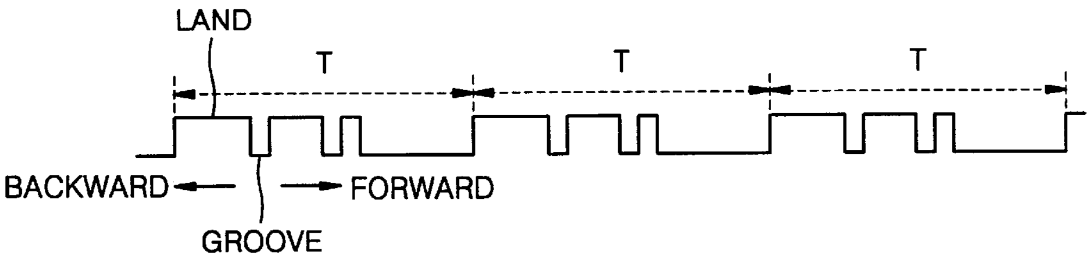
FIG. 5 shows an example of a land-groove pattern of the recording medium.

FIG. 5 shows an example of a regular land-groove pattern formed in a recording medium. Referring to FIG. 5, a predetermined number (=6) of lands and grooves are formed in each period T. The width of each of the two grooves is the same, whereas the widths of the three lands are different from one another, so that the analog signal read therefrom has the direction information. That is, voltage level of the analog signal, which is generated by the cartridge 41A while the reading needle 41B is in contact with the lands and grooves formed in the surface 43 can be varied according to the direction of rotation of the LP record 42A. The reading needle 41B contacts the lands and grooves in the right direction of FIG. 5 as the LP record 42A rotates forward, and contacts the lands and grooves in the left direction of FIG. 5 as the LP record 42B rotates backward.

Figure 6:
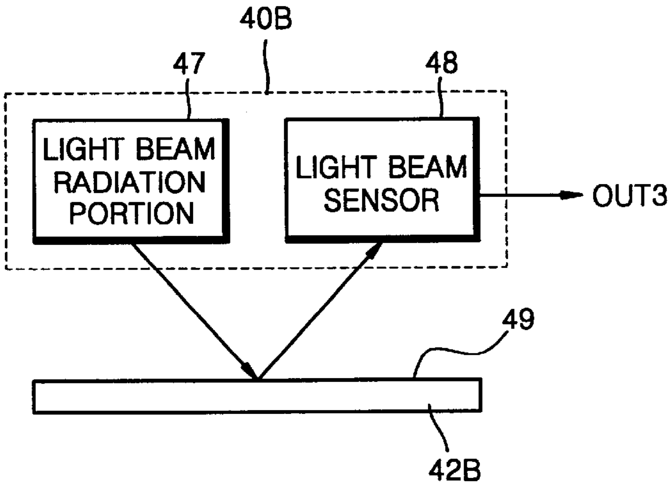
FIG. 6 illustrates another example of the contact portion and the recording medium of FIG. 3.

FIG. 6 shows another example of the contact portion 40 and the recording medium 42 of FIG. 3. A light beam radiation portion 47, a light beam sensor 48, and an optical disc 42B are shown. When the recording medium 42 of FIG. 3 is implemented with the optical disc 42B, the contact portion 40 may be implemented with the light beam radiation portion 47 and the light beam sensor 48, as shown in FIG. 6. The light beam radiation portion 47 applies a light beam onto the optical disc 42B. The light beam sensor 48 senses the light beam reflected from the optical disc 42B, and outputs an analog signal whose voltage level corresponds to the amount of the sensed light beam, to the ADC 44 through an output port OUT3. As the optical disc 42B is moved and the direction and speed of rotation of the optical disc 42B are varied by a user, the light beam sensor 48 generates an analog signal whose voltage level varies corresponding to the amount of the sensed light beam. Here, the amount of the light beam sensed by the light beam sensor 48 varies depending on whether a light beam is applied to lands or grooves formed in the optical disc 42B. For this, a periodic land-groove pattern may be formed in a spiral direction in a surface 49 of the optical disc 42B, as described with reference to FIG. 5.

The ADC 44 converts the analog signal output from the contact portion 40 to a digital signal, and outputs the digital signal to the signal processor 46. Voltage level of the analog signal from the contact portion 40 varies according to whether the reading needle 41B contacts the land-groove pattern forward or backward, as shown in FIG. 5. Thus, the ADC 44 outputs a digital signal having bit patterns which vary depending on the direction of rotation of the recording medium 42.

The signal processor 46 analyzes the bit patterns of the digital signal output from the ADC 44, determines the direction and speed of movement of the recording medium 42, and outputs a trajectory coordinate signal having a first displacement value, which is calculated from the determined direction and speed of movement, to the reproduction signal generator 8. For example, the signal processor 46 determines whether the recording medium 42 is moved forward or backward, according to the bit patterns of the digital signal, and at the same time determines the speed of movement of the recording medium according to the speed of input of the bit patterns of the digital signal. The signal processor 46 determines the sign of the first displacement value according to the direction of movement, and the absolute value of the first displacement value according to the speed of movement.

Turning back to FIG. 1, the reproduction control signal generator 8 analyzes the first and/or second displacement values output from the trajectory detector 6, generates a reproduction control signal according to the result of the analysis, and outputs the reproduction control signal to the audio reproduction unit 20.

In one embodiment, the reproduction control signal generator 8 checks the sign and the absolute value of a first displacement value for a predetermined sampling period ($\Delta t$). The reproduction control signal generator 8 generates a direction control signal according to the checked sign of the first displacement value, and a speed control signal according to the checked absolute value of the first displacement value; and outputs the direction and speed control signals as reproduction control signals to the audio reproduction unit 20.

In another embodiment, the reproduction control signal generator 8 checks the sign and the absolute value of a second displacement value for a predetermined sampling period ($\Delta t$), and generates a first sound pressure control signal according to the checked sign of the second displacement value, and a second sound pressure control signal according to the checked absolute value of the second displacement value. The first sound pressure control signal is used to determine whether to increase or decrease the sound pressure of an audio signal to be reproduced. The second sound pressure control signal has information on variation rate of the sound pressure. The reproduction control signal generator 8 outputs the first and second sound pressure control signals as reproduction control signals to the audio reproduction unit 20.

When the trajectory control signal has both the first and second displacement values, the reproduction control signal generator 8 generates reproduction control signals including all the speed control signal, direction control signal, and first and second sound pressure signals, and outputs the reproduction control signals to the audio reproduction unit 20.

The reproduction control signal generator 8 according to the present invention may further comprise control keys 30 and 32, as illustrated in FIGS. 2A, 2B and 2C. The control keys 30 and 32 are manipulated by a user, and select at least one of a predetermined number of conversion factors from the manipulated result. The reproduction control signal generator 8 multiplies at least one of the first and second displacement values by the selected conversion factor of the control keys 30 and 32, and outputs the product as a reproduction control signal to the audio reproduction unit 20. Here, the predetermined number of conversion factors may be stored in the reproduction control signal generator 8 before the multiplication, or may be provided from the outside for the multiplication.

Generation of the reproduction control signals including the speed control signal, direction control signal, first sound pressure control signal, and/or second sound pressure control in the reproduction control unit 10 of FIG. 1 will be described below with reference to FIG. 7. The trajectory formed with the touch pad 6A (see FIG. 2A), or a mouse (not shown) by a user, which are described as the trajectory detector 6 in the previous embodiments and are moved by a user, is 2-dimensional.

Figure 7:
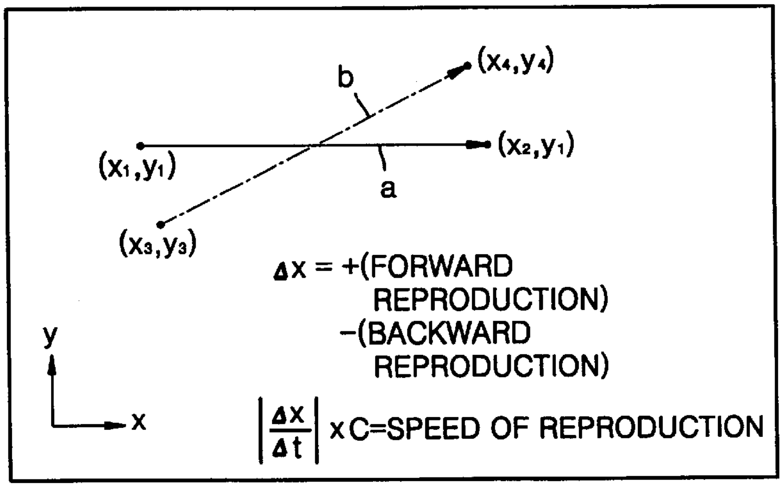
FIG. 7 shows two-dimensional trajectories a and b for illustrating the generation of reproduction control signals.

FIG. 7 shows 2-dimensional trajectories a and b for illustrating the generation of reproduction control signals. The coordinate of the starting point of a 2-dimensional trajectory a is $(x_1, y_1)$, and the coordinate of the end point is $(x_2, y_1)$. The coordinate of the starting point of the other 2-dimensional trajectory b is $(x_3, y_3)$, and the coordinate of the end point is $(x_4, y_4)$.

If a user touches the touch pad 6A, or moves the first mouse only in the X-axis direction for a predetermined sampling period ($\Delta t$), resulting in the 2-dimensional trajectory a, as shown in FIG. 7, the touch pad 6A or the first mouse generates a trajectory coordinate signal having a first displacement value ($\Delta X$) from the X-directional migration length ($x_2-x_1$), and outputs the trajectory coordinate signal to the reproduction control signal generator 8. If the X-directional first displacement value ($\Delta X$) for the predetermined sampling period ($\Delta t$) has the plus (+) sign, the direction of reproduction is determined as the same reproduction direction as the original song (forward). If the first displacement value ($\Delta X$) has the minus (−) sign, the direction of reproduction is determined as the opposite direction to the reproduction of the original song (backward). Then, the reproduction control signal generator 8 outputs a directional control signal having information on the determined reproduction direction to the audio reproduction unit 20. In addition, the reproduction control signal generator 8 calculates a speed value ($|\Delta X/\Delta t|$) from the absolute value ($|\Delta X|=x_2-x_1|$) of the X-directional first displacement value ($\Delta X$) varied for the predetermined sampling period ($\Delta t$), and outputs a speed control signal having the calculated speed value to the audio reproduction unit 20. Here, the reproduction control signal generator 8 multiplies the calculated speed value by a conversion factor C, which is selected from a plurality of conversion factors by manipulating the control key 30 to obtain a new speed value ($|\Delta X/\Delta t| \times C$), and outputs a speed control signal having the new speed value to the audio reproduction unit 20.

The multiplication of the speed value by a conversion factor is performed for the following reason. When an audio signal from an LP record is modulated using a turntable as in a conventional method, a user modifies the speed of rotation of the turntable, which normally rotates at a constant speed, with application of a predetermined force. Assuming that the user who is skilled in modulating an audio signal by adjusting the speed of rotation of a turntable touches the touch pad 6A with the same force as for the turntable, the speed value ($|\Delta X/\Delta t|$), which is calculated by the touch pad 6A, is multiplied by a conversion factor C, such that the product is equivalent to the speed value that corresponds to the detected speed and direction of rotation of the turntable obtained by rotating the conventional LP turntable. Here, a predetermined number of conversion factors are predetermined by modeling the motion of the user over the turntable.

A second displacement value calculated from a displacement in the Y-axis direction with the touch pad 6A or the first mouse can be used as a special reproduction control signal to modify an audio signal in a different manner. For example, when a user touches the touch pad 6A or moves the first mouse in the Y-axis direction, the touch pad 6A or the mouse generates a trajectory coordinate signal having a Y-directional second displacement value ($\Delta Y$), and outputs the trajectory coordinate signal to the reproduction control signal generator 8. The reproduction control signal generator 8 generates a first sound pressure control signal according to the sign of the Y-directional second displacement value ($\Delta Y$), and outputs the first sound pressure control signal to the audio reproduction unit 20. If the Y-directional second displacement value ($\Delta Y$) for a predetermined sampling period ($\Delta t$) has the plus (+) sign, the first sound pressure control signal contains a command to increase the sound pressure. If the Y-directional second displacement value ($\Delta Y$) has the minus (−) sign, the first sound pressure control signal contains a command to decrease the sound pressure. The reproduction control signal generator 8 generates a second sound pressure control signal, which includes information on variation rate of the sound pressure, from the absolute value ($|\Delta Y|$) of the Y-directional second displacement value, and outputs the second sound pressure control signal to the audio reproduction unit 20.

For example, assuming that a user touches the touch pad 6A or moves the first mouse in the X- and Y-axis directions for a predetermined sampling period ($\Delta t$), resulting in the 2-dimensional trajectory b as shown in FIG. 7, the touch pad 6A or the mouse calculates the first and second displacement values ($\Delta X$ and $\Delta Y$) from the migration lengths ($x_4-x_3$, and $y_4-y_3$) in the X- and Y-axis directions, i.e., from the starting coordinate ($x_3$, $y_3$) to the end coordinate ($x_4$, $y_4$) of the 2-dimensional trajectory b, and outputs the results to the reproduction control signal generator 8. As described previously, the reproduction control signal generator 8 generates direction and speed control signals according to the sign and the absolute value of the first displacement value ($\Delta X$), and first and second sound pressure control signals according to the sign and the absolute value of the second displacement value ($\Delta Y$); and outputs the generated control signals to the audio reproduction unit 20.

The audio reproduction unit 20 modifies at least one of the speed and direction of reproduction, and the sound pressure of an audio signal (referred to as first audio signal) read from a first recording medium according to the speed control signal, direction control signal, or the first and second sound pressure control signals output from the reproduction control unit 10.

The structure of a preferred embodiment of the audio reproduction unit 20 of FIG. 1 according to the present invention, and a method of reproducing an audio signal which is performed by the audio reproduction unit 20 will be described below.

Figure 8:
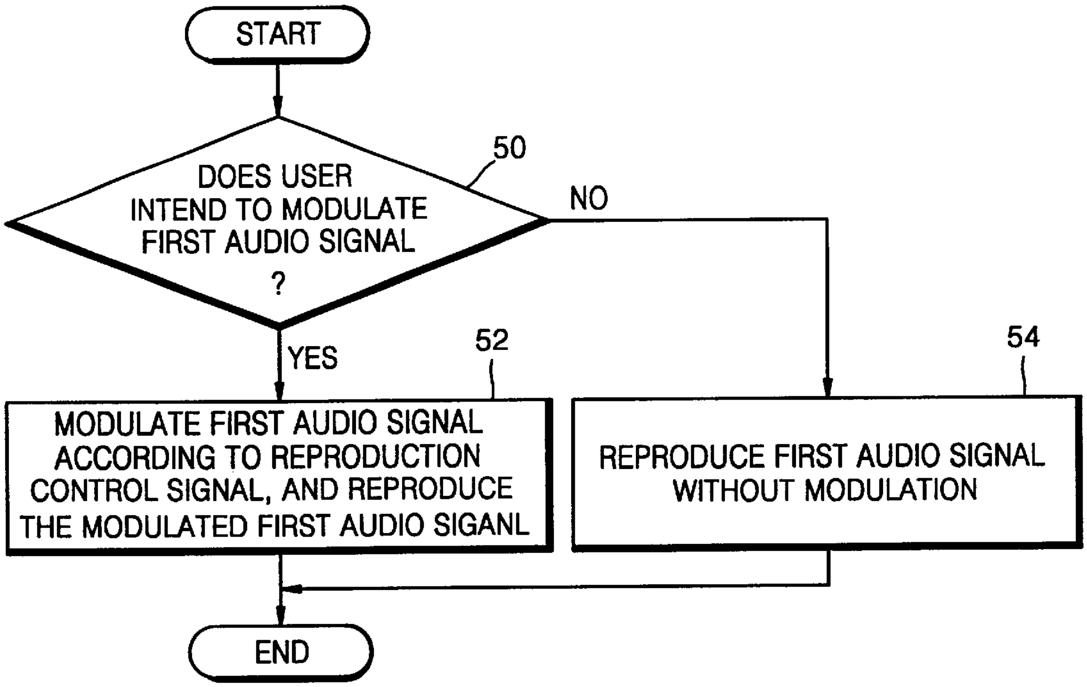
FIG. 8 is a flowchart illustrating a preferred embodiment of an audio reproduction method according to the present invention, which is used by the audio reproduction unit of FIG. 1.

A preferred embodiment of a method for reproducing an audio signal according to the present invention by the audio reproduction unit 20 of FIG. 1 is illustrated in FIG. 8. The method illustrate in FIG. 8 involves steps 50 through 54 of modulating a first audio signal depending on whether a reproduction control signal is generated or not.

The audio reproduction unit 20 according to an embodiment of the present invention includes an address generator 22, a buffer 24 and a reproducer 26, as shown in FIG. 1. The audio reproduction unit 20 modulates and reproduces the first audio signal as follows. First, the address generator 22 determines whether a user desires to modulate the first audio signal (step 50). For this determination, the address generator 22 checks whether a reproduction control signal, such as a speed or direction control signal, first sound pressure control signal, or second sound pressure control signal, is input from the reproduction control unit 10. If it is determined that the first audio signal is to be modulated, the first audio signal is modulated and reproduced according to the reproduction control signal in the audio reproduction unit 20 (step 52). For example, if at least one of the speed control signal, direction control signal, and first and second sound pressure control signals is input, the audio reproduction unit 20 modulates at least one of the speed and direction of reproduction, and the sound pressure of the first audio signal, according to the input at least one of the speed control signal, direction control signal, and the first and second sound pressure control signals, and reproduces the modulated first audio signal.

In step 52, when a reproduction control signal is output from the reproduction control unit 10, the address generator 22 generates an address at a speed in order determined according to the input reproduction control signal, and outputs the address to the buffer 24. The buffer 24 receives the first audio signal recorded in the first recording medium through an input port IN, buffers the input first audio signal, and outputs the buffered first audio signal to the reproducer 24 according to the address output from the address generator 22. In particular, the address generator 22 analyzes the speed of reproduction of the first audio signal from an input speed control signal, and determines whether to output the first audio signal temporarily stored in the buffer 24 at a high or low speed using the analyzed result. The address generator 22 analyzes the direction of reproduction of the first audio signal from an input direction control signal, and determines whether to output the first audio signal temporarily stored in the buffer 24 in order or in reverse order, using the analyzed result. The address generator 22 generates an address according to the determined result.

In other words, the first audio signal is modulated by adjusting the interval and speed of output of the first audio signal from the buffer 24 according to the address generated by the address generator 22. The reproducer 26 just reproduces the modulated first audio signal from the buffer 24.

On the other hand, if it is determined that a user does not intend to modulate the first audio signal, the audio reproduction unit 20 reproduces the first audio signal without modulation (step 54). In particular, when no reproduction control signal is output from the reproduction control unit 10, the address generator 22 generates an address which allows the first audio signal stored in the buffer 24 to be output in normal order and at normal speed. The reproducer 26 just reproduces the first audio signal in normal order at normal speed.

Any digital or analog music reproduction apparatus such as an MP3 player, a digital audio tape player (DAT), a CD player, or an accompaniment player(also referred to as sing-along device), may manufactured such that it can serve as the audio reproduction unit 20 shown in FIG. 1. In this case, the reproduction control unit 10 is manufactured as a separate unit, and then can be optionally connected to the music reproduction apparatus serving as the audio reproduction unit 20. The audio reproduction unit 20 may have an anti-shock function for smooth reproduction of the first audio signal. For the anti-shock function, the buffer 24 buffers the first audio signal to be reproduced for about 10–40 seconds.

Alternatively, the digital or analog music reproduction apparatus described above may be manufactured such that it can perform the functions of both the reproduction control unit 10 and the audio reproduction unit 20.

Alternatively, the audio reproduction unit 20 may be installed in, such as a personal computer (PC, not shown). In this case, the reproduction control unit 10 is manufactured as a separate unit, and then can be optionally connected to the PC. The buffer 24 may be implemented by a memory (not shown) of the PC. The first audio signal input to the audio reproduction unit 20 through the input port IN shown in FIG. 1 may be data stored in CD-ROM file (.cda), MP3 file (.mp3), WAVE file (.wav), or RA (Real Audio) file which can be reproduced by PC. Here, .cda, .mp3, and .wav indicate extensions of the files.

Figure 9:
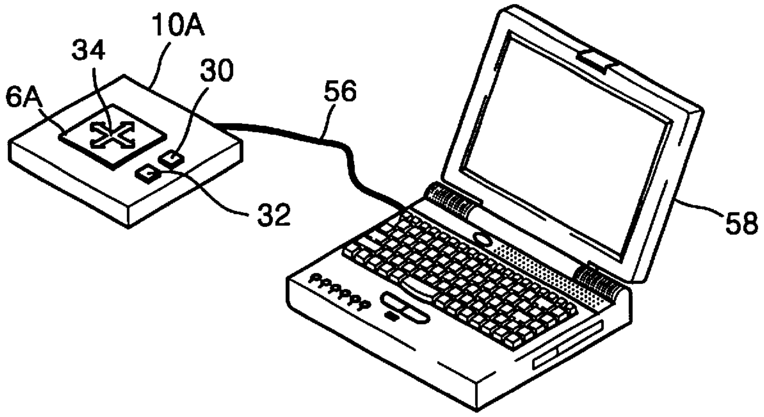
FIG. 9 shows a personal computer (PC) and a reproduction control unit which are connected to each other, and serve as another embodiment of the audio reproduction apparatus according to the present invention.

For easy understanding of the present invention in case a PC including the audio reproduction unit 20 is connected with the reproduction control unit 10A, which is separately manufactured as the touch pad 6A, as described with reference to FIG. 2A, the structure of the PC, the connection and operation of the PC and the reproduction control unit 10A will be described with reference to drawings. FIG. 9 shows a PC 58 and the reproduction control unit 10A which are connected to each other. The PC 58 and the reproduction control unit 10A may be connected by, for example, a universal serial bus (UBS). This is because the UBS is advantageous in its faster data transfer rate than other buses.

Figure 10:
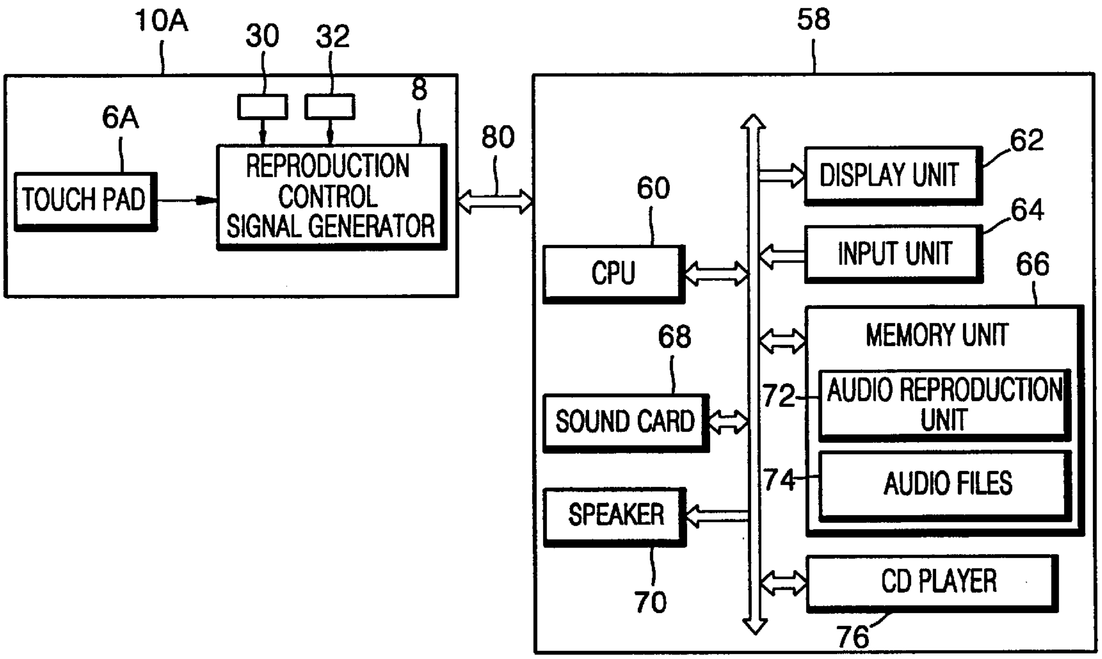
FIG. 10 is a block diagram of the reproduction control unit and the PC connected as shown in FIG. 9.

FIG. 10 is a block diagram of the reproduction control unit 10A and the PC 58 connected as shown in FIG. 9. The structure and function of the reproduction control unit 10A of FIGS. 9 and 10 are the same as those of the reproduction control unit 10A of FIG. 2A, and thus descriptions of the structure and function of the reproduction control unit 10A are not provided here. The PC 58 of FIG. 10 includes a central processor unit (CPU) 60, a display unit 62, an input unit 64, a memory unit 66 including an audio reproduction unit 72 and audio files 74, a sound card 68, a speaker 70, and a CD player 76.

Figure 11:
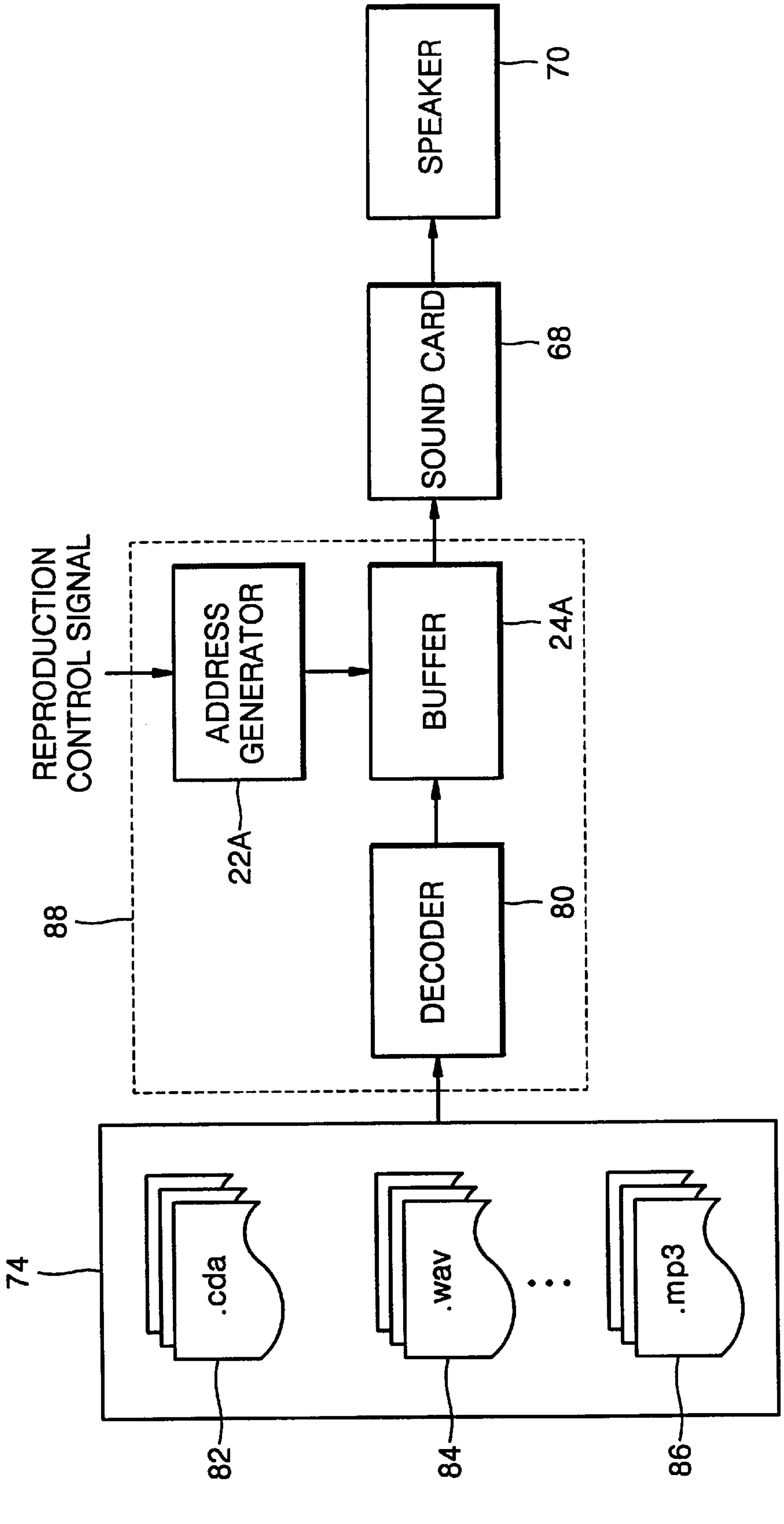
FIG. 11 shows a preferred embodiment of the audio reproduction unit of FIG. 10 according to the present invention.

FIG. 11 shows a preferred embodiment of the audio reproduction unit 72 of FIG. 10 according to the present invention. The audio reproduction unit 88 of FIG. 11 includes a decoder 80, an address generator 22A, and a buffer 24A. The structure and function of the audio reproduction unit 88 are the same as those of the audio reproduction unit 20 of FIG. 1, except that the audio reproduction unit 88 further includes the decoder 80 for decoding a first audio signal output from the audio files 74 or input through a network. In other words, the address generator 22A and the buffer 24A perform the same functions as the address generator 22 and the buffer 24 shown in FIG. 1. The modulation and reproduction of the first audio signal by the audio reproduction unit 88 will be described below.

When the CPU 60 of the PC 58 runs an operation program for the audio reproduction unit 88, which is read from another memory (not shown) of the memory unit 66, a song select menu is displayed on the display unit 62. As a user selects a song in the song select menu using the input unit 64, a first audio signal corresponding to the selected song is read from the audio files 74 and input to the audio reproduction unit 88. The audio files 74 may store the first audio signal compressed in a variety of ways. For example, the audio files 74 may be CD-ROM files (.cda) 82, WAVE files (.wav) 84, MP3 files (.mp3) 86, or RA filles.

The decoder 80 of the audio reproduction unit 88 decodes the first audio signal read from the audio files 74, which corresponds to the selected song, into .wav Windows Standard Audio files, and outputs the decoded first audio signal to the buffer 24A. The decoded first audio signal stored in the buffer 24A which has a timing information is output to the sound card 68 according to the reproduction control signal. For this, like the address generator 22 of FIG. 1, the address generator 22A analyzes the reproduction control signal output from the reproduction control unit 10, which includes at least one of the speed and direction control signals, and the first and second sound pressure control signals, and generates an address according to the analyzed result and outputs the generated address to the address buffer 24A. If no reproduction control signal is input to the address generator 24A, the address generator 24A generates an address which allows the first audio signal stored in the buffer 24A to be reproduced forward at normal speed, to the buffer 24A. Alternatively, the address generator 22A stops generating an address, such that the buffer 24A retains the first audio signal, i.e., does not output the first audio signal. The first audio signal output from the buffer 24A is reproduced through the sound card 68 and the speaker 70. The first audio signal is reproduced after modulation or without modulation, as described previously, and provided to the user.

Alternatively, the audio reproduction unit 72 of FIG. 10 may be implemented in a different way from in FIG. 11. The audio reproduction unit 72 may serve as only the reproducer 26 of FIG. 1. In this case, the CPU 60 may serve as the address generator 22 of FIG. 1, and another memory (not shown) of the memory unit 66 may serve as the buffer 24 of FIG. 1.

The structure and operation of a remixing apparatus according to the present invention, to which the audio reproduction apparatus of FIG. 1 is applied, and a remixing method according to the present invention by the remixing apparatus will be described with reference FIGS. 12 and 13.

Figure 12:
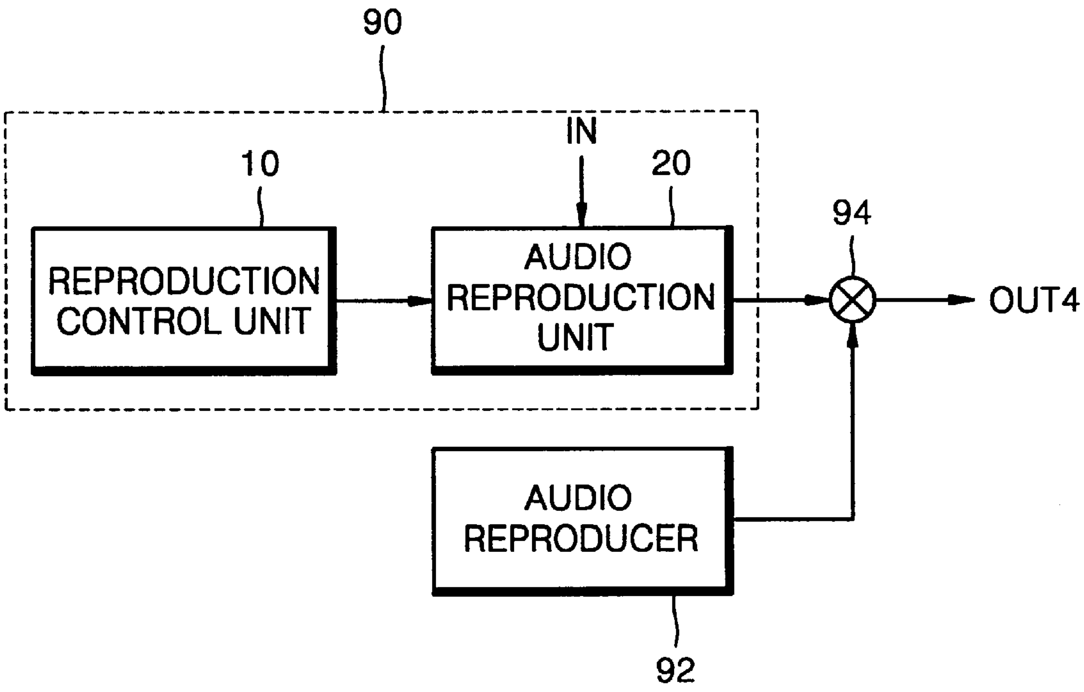
FIG. 12 is a block diagram of a preferred embodiment of a remixing apparatus according to the present invention, which employs the audio reproduction apparatus of FIG. 1.
Figure 13:
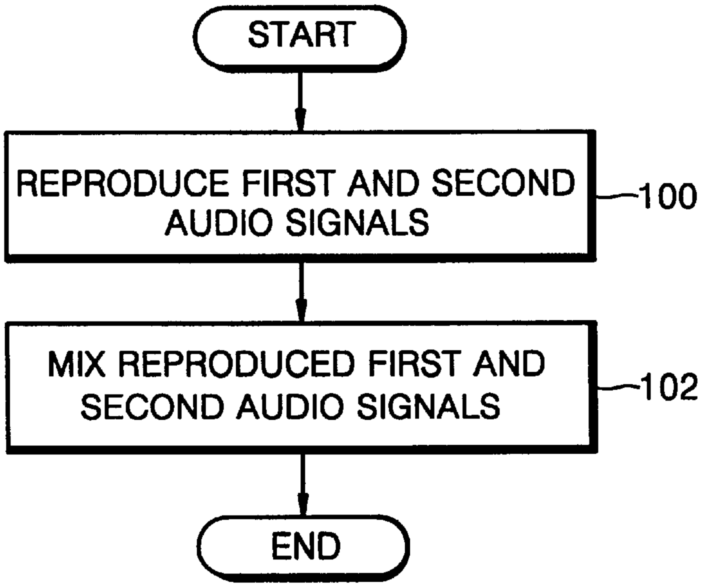
FIG. 13 is a flowchart illustrating a remixing method according to the present invention, which is used by the remixing apparatus of FIG. 12.

FIG. 12 is a block diagram of a remixing apparatus according to the present invention, which employs the audio reproduction apparatus of FIG. 1. As shown in FIG. 12, the remixing apparatus includes the audio reproduction apparatus 90, an audio reproducer 92, and a signal synthesizer 94. FIG. 13 is a flowchart of a remixing method according to the present invention performed by the remixing apparatus of FIG. 12. To obtain a remixed audio signal, the remixing method includes separately reproducing the first and second audio signals, and mixing the reproduced first and second audio signals (steps 100 and 102). The audio reproduction apparatus 90 of FIG. 12, which includes the reproduction control unit 10 and the audio reproduction unit 20, corresponds to the audio reproduction apparatus of FIG. 1, and thus a detailed description of the audio reproduction apparatus 90 is not provided here.

To obtain a remixed audio signal, first and second audio signals are separately reproduced (step 100). In particular, the audio reproduction apparatus 90 of FIG. 12 optionally modulates a first audio signal, and reproduces the modulated first audio signal, as described previously, and outputs the reproduced first audio signal to the signal synthesizer 94. The audio reproducer 92 reproduces a second audio signal from a second recording medium forward at normal speed, and outputs the reproduced second audio signal to the signal synthesizer 94. The audio reproducer 92 may be an analog or digital music reproduction apparatus described previously.

After step 100, the reproduced first and second audio signals are mixed to obtain a remixed audio signal (step 102). The signal synthesizer 94, which may be implemented with a common mixer, mixes the first and second audio signals, which are output from the audio reproduction apparatus 90 and the audio reproducer 92, respectively, and outputs the mixed result as the remixed audio signal through an output port OUT4.

Although the remixing apparatus of FIG. 12 is constructed to mix only two audio signals, the remixing apparatus according to the present invention is not limited to this structure and can be constructed to mix a plurality of audio signals. In this case, unlike the remixing apparatus of FIG. 12, the remixing apparatus may include a plurality of audio reproducers each of which has the same structure and performs the same operation as the audio reproducer 92.

To mix just two songs, the audio reproducer 92 of FIG. 12, for example, a CD layer 76, may be installed in a PC 58, as shown in FIG. 10. In this case, the signal synthesizer 94 may be installed in the PC 58. Alternatively, the CPU 60 may serve as the signal synthesizer 94. In addition, the remixed audio signal may be stored in the memory unit 66, and may be output through the speaker 70. In the case where the remixed audio signal is stored in the memory unit 66, the memory unit 66 stores only remixing related information as files. Here, the remixing related information includes information for the loading of a first audio signal from the audio files 74 by the audio reproducer 72, information on the modulation of the first audio signal, or information on the mixing of the first audio signal and a second audio signal reproduced by the CD player 76. Because there is no need to store data of the modulated songs corresponding to the remixed audio signal, the storage space of the memory unit 66 can be saved. In addition, the stored files, which have a relatively small capacity, can be easily shared over a network.

As described previously, unlike the convention audio signal processor which modulates and reproduces an audio signal using only one displacement value obtained from one dimensional trajectory, the audio reproduction apparatus and method in which an audio signal can be modulated, the remixing apparatus employing the audio reproduction apparatus, and the remixing method used by the remixing apparatus according to the present invention can modulate an audio signal in a variety of ways by varying at least one of reproduction factors, such as the direction and speed of reproduction, and the sound pressure of an audio signal, using one or more displacement values obtained by analyzing a two-dimensional trajectory. Because no rotatable circular plate is used for the modulation of an audio signal, the structures of the audio reproduction apparatus and the remixing apparatus are simple, and the manufacturing cost becomes lower. A fine modulation of the audio signal is also possible. Although a rotatable circular plate such as a turntable is used, a mouse instead of a needle is used along with the circular plate, so that many drawbacks which would occur by use of the needle can be eliminated. A digital audio signal of a CD can be efficiently modulated and reproduced without need for remastering into an LP record. A high-resolution digital audio signal can be modulated and reproduced at an accurate sampling rate.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An audio reproduction apparatus having audio modulation function, for reproducing a first audio signal recorded in a predetermined first recording medium, the audio reproduction apparatus comprising:

- a reproduction control unit for measuring first and second displacement values and for generating a reproduction control signal by analyzing at least one of said first and second displacement values, which are variable by a user, and outputting the generated reproduction control signal; and
- an audio reproduction unit for modulating and reproducing the first audio signal according to the reproduction control signal.

2. The audio reproduction apparatus of claim 1, wherein the reproduction control unit comprises:

- a trajectory detector operated by the user, for detecting a trajectory coordinate signal having at least one of the first and second displacement values detected from the operated result; and
- a reproduction control signal generator for analyzing the at least one of the first and second displacement values of the trajectory coordinate signal, generating the reproduction control signal according to the analyzed result, and outputting the reproduction control signal to the audio reproduction unit.

3. The audio reproduction apparatus of claim 1, wherein the audio generation unit comprises:

- a buffer for buffering the first audio signal to be reproduced, and outputting the buffered first audio signal according to an address;
- an address generator for determining the order and speed of output of the address according to the reproduction control signal, and outputting the address according to the determined result; and
- a reproducer for reproducing the first audio signal output from the buffer.

4. The audio reproduction apparatus of claim 2, wherein the reproduction control signal generator checks the sign and the absolute value of the first displacement value for a predetermined sampling period, generates a direction control signal according to the checked sign, and a speed control signal according to the checked absolute value, and outputs the direction and speed control signals as reproduction control signals to the audio reproduction unit; and

- the audio reproduction unit reproduces the first audio signal at a speed corresponding to the speed control signal and/or in a direction corresponding to the direction control signal.

5. The audio reproduction apparatus of claim 2, wherein the reproduction control signal generator checks the sign and the absolute value of the second displacement value for a predetermined sampling period; generates a first sound pressure control signal according to the checked sign of the second displacement value, and a second sound pressure control signal according to the checked absolute value of the second displacement value; and outputs the first and second sound pressure control signals as reproduction control signals to the audio reproduction units, wherein the first sound pressure control signal has information on whether to increase or decrease the sound pressure of the first audio signal to be reproduced, and the second sound pressure control signal has information on variation rate of the sound pressure, and the audio reproduction unit reproduces the first audio signal at a sound pressure corresponding to the first and second sound pressure control signals.

6. The audio reproduction apparatus of claim 4, wherein the reproduction control signal generator checks the sign and the absolute value of the second displacement value for a predetermined sampling period; generates a first sound pressure control signal according to the checked sign of the second displacement value, and a second sound pressure control signal according to the checked absolute value of the second displacement value; and outputs the first and second sound pressure control signals as reproduction control signals to the audio reproduction units, wherein the first sound pressure control signal has information on whether to increase or decrease the sound pressure of the first audio signal to be reproduced, and the second sound pressure control signal has information on variation rate of the sound pressure, and the audio reproduction unit reproduces the first audio signal at a sound pressure corresponding to the first and second sound pressure control signals.

7. The audio reproduction apparatus of claim 2, wherein the trajectory detector comprises a touch pad which is touched by a user in the up, down, left and right directions, the touch pad for detecting the trajectory of the touch pad as the touched result, calculating the first and second displacement values from the coordinate values of the detected trajectory, and outputting the trajectory coordinate signal having the first and second displacement values to the reproduction control signal generator.

8. The audio reproduction apparatus of claim 2, wherein the trajectory detector comprises a first mouse which is moved by a user in the up, down, left and right directions, the first mouse for detecting the trajectory of the mouse as the operated result, calculating the first and second displacement values from the coordinate values of the detected trajectory, and outputting the trajectory coordinate signal having the first and second displacement values to the reproduction control signal generator.

9. The audio reproduction apparatus of claim 2, wherein the trajectory detector comprises:

a rotatable circular plate which is rotated by a user; and a second mouse for sensing the speed and direction of rotation of the circular plate in contact with the circular plate, calculating the first displacement value from the sensed result, and outputting the trajectory coordinate signal having the first displacement value to the reproduction control signal generator.

10. An audio reproduction apparatus having audio modulation function, for reproducing a first audio signal recorded in a predetermined first recording medium, the audio reproduction apparatus comprising:

a reproduction control unit for generating a reproduction control signal by analyzing at least one of said first and second displacement values, which are varied by a user, and outputting the generated reproduction control signal; and an audio reproduction unit for modulating and reproducing the first audio signal according to the reproduction control signal, wherein the reproduction control unit comprises:

a trajectory detector operated by the user, for detecting a trajectory coordinate signal having at least one of the first and second displacement values detected from the operated result; and a reproduction control signal generator for analyzing the at least one of the first and second displacement values of the trajectory coordinate signal, generating the reproduction control signal according to the analyzed result, and outputting the reproduction control signal to the audio reproduction unit, and wherein the trajectory detector comprises a jog shuttle dial which is rotated by a user, the jog shuttle dial for sensing the rotated result as the operated result, obtaining the first displacement value from the sensed result, and outputting the trajectory coordinate signal having the first displacement value to the reproduction control signal generator.

11. An audio reproduction apparatus having audio modulation function, for reproducing a first audio signal recorded in a predetermined first recording medium, the audio reproduction apparatus comprising:

a reproduction control unit for generating a reproduction control signal by analyzing at least one of said first and second displacement values, which are varied by a user, and outputting the generated reproduction control signal; and an audio reproduction unit for modulating and reproducing the first audio signal according to the reproduction control signal, wherein the reproduction control unit comprises:

a trajectory detector operated by the user, for detecting a trajectory coordinate signal having at least one of the first and second displacement values detected from the operated result; and a reproduction control signal generator for analyzing the at least one of the first and second displacement values of the trajectory coordinate signal, generating the reproduction control signal according to the analyzed result, and outputting the reproduction control signal to the audio reproduction unit, and wherein the trajectory detector comprises:

a recording medium which is moved at a speed and in a direction varied by a user, the recording medium having a predetermined number of lands and grooves in the surface of a spiral sound groove of the recording medium;

a contact portion for generating an analog signal having a direction information which indicates the direction in which the recording medium is rotated, while moving in contact with the lands and grooves of the recording medium;

an analog-to-digital converter for converting the analog signal to a digital signal, and outputting the digital signal; and a signal processor for calculating the first displacement value corresponding to the direction and speed of movement of the recording medium by analyzing the digital signal, and outputting the trajectory coordinate signal having the first displacement value to the reproduction signal generator.

12. The audio reproduction apparatus of claim 11, wherein the recording medium is a long-playing (LP) record, and the contact portion comprises a needle and a cartridge which cooperatively generate the analog signal and output the analog signal to the analog-to-digital converter, wherein the needle is placed in contact with the lands and grooves of the recording medium.

13. The audio reproduction apparatus of claim 11, wherein the recording medium is an optical disc, and the contact portion comprises:

a light beam radiation portion for applying a light beam onto the optical disc; and a light beam sensor for sensing the light beam reflected from the optical disc, and outputting an analog signal whose amplitude corresponds to the amount of the sensed light beam to the analog-to-digital converter.

14. The audio reproduction apparatus of claim 7, wherein the reproduction control signal generator further comprises at least one control key for selecting at least one conversion factor from a predetermined number of conversion factors by manipulation of the user, and outputting the at least one selected conversion factor, and the reproduction control signal generator multiplies at least one of the first and second displacement values by the at least one conversion factor output from the control key, and outputting the product as the reproduction control signal to the audio reproduction unit.

15. The audio reproduction apparatus of claim 8, wherein the reproduction control signal generator further comprises at least one control key for selecting at least one conversion factor from a predetermined number of conversion factors by manipulation of the user, and outputting the at least one selected conversion factor, and the reproduction control signal generator multiplies at least one of the first and second displacement values by the at least one conversion factor output from the control key, and outputting the product as the reproduction control signal to the audio reproduction unit.

16. The audio reproduction apparatus of claim 9, wherein the reproduction control signal generator further comprises at least one control key for selecting at least one conversion factor from a predetermined number of conversion factors by manipulation of the user, and outputting the at least one selected conversion factor, and the reproduction control signal generator multiplies at least one of the first and second displacement values by the at least one conversion factor output from the control key, and outputting the product as the reproduction control signal to the audio reproduction unit.

17. The audio reproduction apparatus of claim 10, wherein the reproduction control signal generator further comprises at least one control key for selecting at least one conversion factor from a predetermined number of conversion factors by manipulation of the user, and outputting the at least one selected conversion factor, and the reproduction control signal generator multiplies at least one of the first and second displacement values by the at least one conversion factor output from the control key, and outputting the product as the reproduction control signal to the audio reproduction unit.

18. The audio reproduction apparatus of claim 11, wherein the reproduction control signal generator further comprises at least one control key for selecting at least one conversion factor from a predetermined number of conversion factors by manipulation of the user, and outputting the at least one selected conversion factor, and the reproduction control signal generator multiplies at least one of the first and second displacement values by the at least one conversion factor output from the control key, and outputting the product as the reproduction control signal to the audio reproduction unit.

19. The audio reproduction apparatus of claim 12, wherein the reproduction control signal generator further comprises at least one control key for selecting at least one conversion factor from a predetermined number of conversion factors by manipulation of the user, and outputting the at least one selected conversion factor, and the reproduction control signal generator multiplies at least one of the first and second displacement values by the at least one conversion factor output from the control key, and outputting the product as the reproduction control signal to the audio reproduction unit.

20. The audio reproduction apparatus of claim 13, wherein the reproduction control signal generator further comprises at least one control key for selecting at least one conversion factor from a predetermined number of conversion factors by manipulation of the user, and outputting the at least one selected conversion factor, and the reproduction control signal generator multiplies at least one of the first and second displacement values by the at least one conversion factor output from the control key, and outputting the product as the reproduction control signal to the audio reproduction unit.

21. An audio reproduction method for the audio reproduction apparatus of claim 1, the method comprising:

(a) determining whether a user intends to modulate the first audio signal;

(b) just reproducing the first audio signal if it is determined that the user does not intend to modulate the first audio signal; and (c) modulating and reproducing the first audio signal according to the reproduction control signal if it is determined that the user intends to modulate the first audio signal.

22. The audio reproduction method of claim 21, wherein, in step (a) of determining whether to modulate the first audio signal, it is determined whether the reproduction control signal is generated or not, wherein the reproduction control signal is obtained by analyzing at least one of the first and second displacement values which are varied by the user.

23. A remixing apparatus comprising:

an audio reproduction apparatus having audio modulation function, for reproducing a first audio signal recorded in a predetermined first recording medium, the audio reproduction apparatus comprising:

a reproduction control unit for measuring first and second displacement values and for generating a reproduction control signal by analyzing at least one of said first and second displacement values, which are variable by a user, and outputting the generated reproduction control signal; and an audio reproduction unit for modulating and reproducing the first audio signal according to the reproduction control signal which optionally modulates the first audio signal;

an audio reproducer for reproducing a second audio signal recorded in a second recording medium; and a signal synthesizer for mixing the first audio signal output from the audio reproduction apparatus, and the second audio signal output from the audio reproducer, for outputting the mixed result as a remixed audio signal.

24. A remixing method for the remixing apparatus of claim 23, the remixing method comprising:

reproducing the first and second audio signals; and mixing the reproduced first and second audio signals and outputting the remixed audio signal.

* * * * *